(12) United States Patent
Kutsubo et al.

(10) Patent No.: US 9,863,531 B2
(45) Date of Patent: Jan. 9, 2018

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Hiroyuki Kutsubo, Nagoya (JP); Kazuki Kojima, Nukata (JP); Koji Makino, Okazaki (JP); Yoshimitsu Hyodo, Nishio (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 44 days.

(21) Appl. No.: 15/108,987

(22) PCT Filed: Feb. 12, 2015

(86) PCT No.: PCT/JP2015/053806
§ 371 (c)(1),
(2) Date: Jun. 29, 2016

(87) PCT Pub. No.: WO2015/122451
PCT Pub. Date: Aug. 20, 2015

(65) Prior Publication Data
US 2016/0327154 A1 Nov. 10, 2016

(30) Foreign Application Priority Data

Feb. 12, 2014 (JP) ................................ 2014-024932
Jun. 3, 2014 (JP) ................................ 2014-114652

(51) Int. Cl.
*F16H 61/12* (2010.01)
*F16H 61/02* (2006.01)

(52) U.S. Cl.
CPC ......... *F16H 61/12* (2013.01); *F16H 61/0206* (2013.01); *F16H 2061/1252* (2013.01); *F16H 2061/1264* (2013.01)

(58) Field of Classification Search
CPC ................. F16H 61/12; F16H 61/0206; F16H 2061/1264; F16H 2061/1252
See application file for complete search history.

(56) References Cited

U.S. PATENT DOCUMENTS 8,012,051 B2 * 9/2011 Soga ....................... F16H 61/12
474/110
9,759,315 B2 * 9/2017 Ichikawa ................ F16H 61/12
(Continued)

FOREIGN PATENT DOCUMENTS

JP 2005-024060 A 1/2005
JP 2008-128473 A 6/2008
(Continued)

OTHER PUBLICATIONS

May 12, 2015 International Search Report issued in International Patent Application No. PCT/JP2015/053806.

*Primary Examiner* — Justin Holmes
*Assistant Examiner* — Lillian Nguyen
(74) *Attorney, Agent, or Firm* — Oliff PLC (57) ABSTRACT

A hydraulic control device that includes a second switching valve that is switchable between a third position in which the forward range pressure input from the first switching valve is output to the shift controller and the reverse range pressure is blocked when the second signal pressure is off and a fourth position in which the reverse range pressure input from the first switching valve is output to the shift controller and the forward range pressure is blocked when the second signal pressure is on.

8 Claims, 5 Drawing Sheets

(56) References Cited

U.S. PATENT DOCUMENTS

| | | | |
|---|---|---|---|
| 2002/0022543 A1* | 2/2002 | Godecke | F16H 61/12 475/131 |
| 2010/0081546 A1* | 4/2010 | Yoshioka | F16H 61/0206 477/131 |
| 2013/0233110 A1 | 9/2013 | Kinoshita | |
| 2014/0128187 A1* | 5/2014 | Iraha | F16H 61/0206 474/8 |

FOREIGN PATENT DOCUMENTS

| | | |
|---|---|---|
| JP | 2012-007630 A | 1/2012 |
| JP | 2012-082969 A | 4/2012 |
| JP | 2013-185656 A | 9/2013 |
| JP | 2013-245770 A | 12/2013 |

* cited by examiner

| RANGE | SC2 | SC3 | SR | PRESSURE OUTPUT TO SHIFT CONTROL UNIT |
|---|---|---|---|---|
| P | ○ | × | × | × |
| R | ○ | ○ | × | PR |
| N | × | ○ | × | × |
| D | × | × | × | PD |

FIG. 5

HYDRAULIC CONTROL DEVICE FOR AUTOMATIC TRANSMISSION

BACKGROUND

The present disclosure relates to a hydraulic control device for an automatic transmission mounted on an automobile, for example, and specifically relates to a hydraulic control device for a shift-by-wire-type automatic transmission that can switch travel ranges with a plurality of switching valves that are electrically controlled.

Conventionally, a shift-by-wire-type range switching device including two switching valves and two solenoid valves that can switch the respective switching valves has been known (see Japanese Patent Application Publication No. 2013-185656). In this range switching device, a combination of spool positions of the two switching valves allows switching among a forward range state, a reverse range state, and an N range state. Furthermore, in this range switching device, when one of the two solenoid valves fails, the N range state is formed by operation of the other of the solenoid valves. This enables the range switching device to prevent formation of an unintended shift speed for forward or reverse traveling when either one of the two solenoid valves fails.

Another shift-by-wire-type range switching device including two switching valves and two solenoid valves that can switch the respective switching valves has also been known (see FIG. 12 in Japanese Patent Application Publication No. 2008-128473). In this range switching device, a first switching valve switches between outputting input line pressure as a range pressure and blocking the input line pressure, and a second switching valve can switch the range pressure input from the first switching valve between forward range pressure and reverse range pressure to output the resulting range pressure. In this range switching device, the first switching valve is configured to be self-held with the output range pressure. This enables the range pressure output from the first switching valve to be maintained, thereby maintaining the traveling state even in the event of off failure of the solenoid valve for switching the first switching valve during traveling.

SUMMARY

However, with the hydraulic control device described above in Japanese Patent Application Publication No. 2013-185656, when one of the two solenoid valves fails, the N range state is formed to stop the forward range pressure from being output, thereby disabling forward traveling. With the hydraulic control device described above in Japanese Patent Application Publication No. 2008-128473, in the event of off failure of the solenoid valve for switching the first switching valve, the engine is temporarily stopped, and the line pressure decreases. Even if the engine is restarted after the self-holding of the first switching valve is canceled, the first switching valve remains in a blocked state to stop the forward range pressure from being output, thereby disabling forward traveling.

Thus, in both of the hydraulic control devices described above, there may be cases where the forward range pressure is not output in the event of off failure of one of the two solenoid valves or in the event of all-off failure of a plurality of solenoid valves.

In view of this, an exemplary aspect of the disclosure provides a hydraulic control device for an automatic transmission that includes a shift-by-wire-type range switching device using at least two switching valves, and thereby can ensure output of forward range pressure even in the event of off failure of at least one of solenoid valves for switching the respective switching valves.

A hydraulic control device according to an exemplary aspect of the disclosure includes a shift controller that controls a speed change mechanism; a first solenoid valve that is capable of outputting first signal pressure; a first switching valve into which source pressure is input and that is switchable between a first position in which the source pressure input is output as forward range pressure when the first signal pressure is off and a second position in which the source pressure input is output as reverse range pressure when the first signal pressure is on; a second solenoid valve that is capable of outputting second signal pressure; and a second switching valve that is switchable between a third position in which the forward range pressure input from the first switching valve is output to the shift controller and the reverse range pressure is blocked when the second signal pressure is off and a fourth position in which the reverse range pressure input from the first switching valve is output to the shift controller and the forward range pressure is blocked when the second signal pressure is on.

With the hydraulic control device for an automatic transmission, even in the event of off failure of at least one of the solenoid valves for switching the respective switching valves, the first switching valve can be set in the first position and the second switching valve can be set in the third position. This can ensure that the forward range pressure is output to the shift control unit even in such an event. Similarly, when the first switching valve has stuck in the first position or when the second switching valve has stuck in the third position, for example, it can be ensured that the forward range pressure is output to the shift control unit.

DETAILED DESCRIPTION OF EMBODIMENTS

The present embodiment will now be described with reference to FIG. 1 to FIG. 5.

A hydraulic control device for an automatic transmission according to the present disclosure is preferably used for a hydraulic control device for a shift-by-wire-type automatic transmission that electrically controls switching valves in response to changing of the travel range performed by a driver and outputs line pressure (source pressure) PL as a predetermined range pressure to a predetermined oil passage to perform shift control. As this automatic transmission, a multi-stage transmission can be used that has, for example, four clutches, two brakes, and one one-way clutch, and that can selectively form eight forward speeds and one reverse speed by simultaneously engaging two of these engagement elements (see Japanese Patent Application Publication No. 2011-214644, for example). The hydraulic control device for an automatic transmission can be applied not only to such a multi-stage transmission, but can also be applied to a belt-type continuously variable transmission (CVT) and a hybrid drive apparatus, for example, in the same manner.

Figure 1:
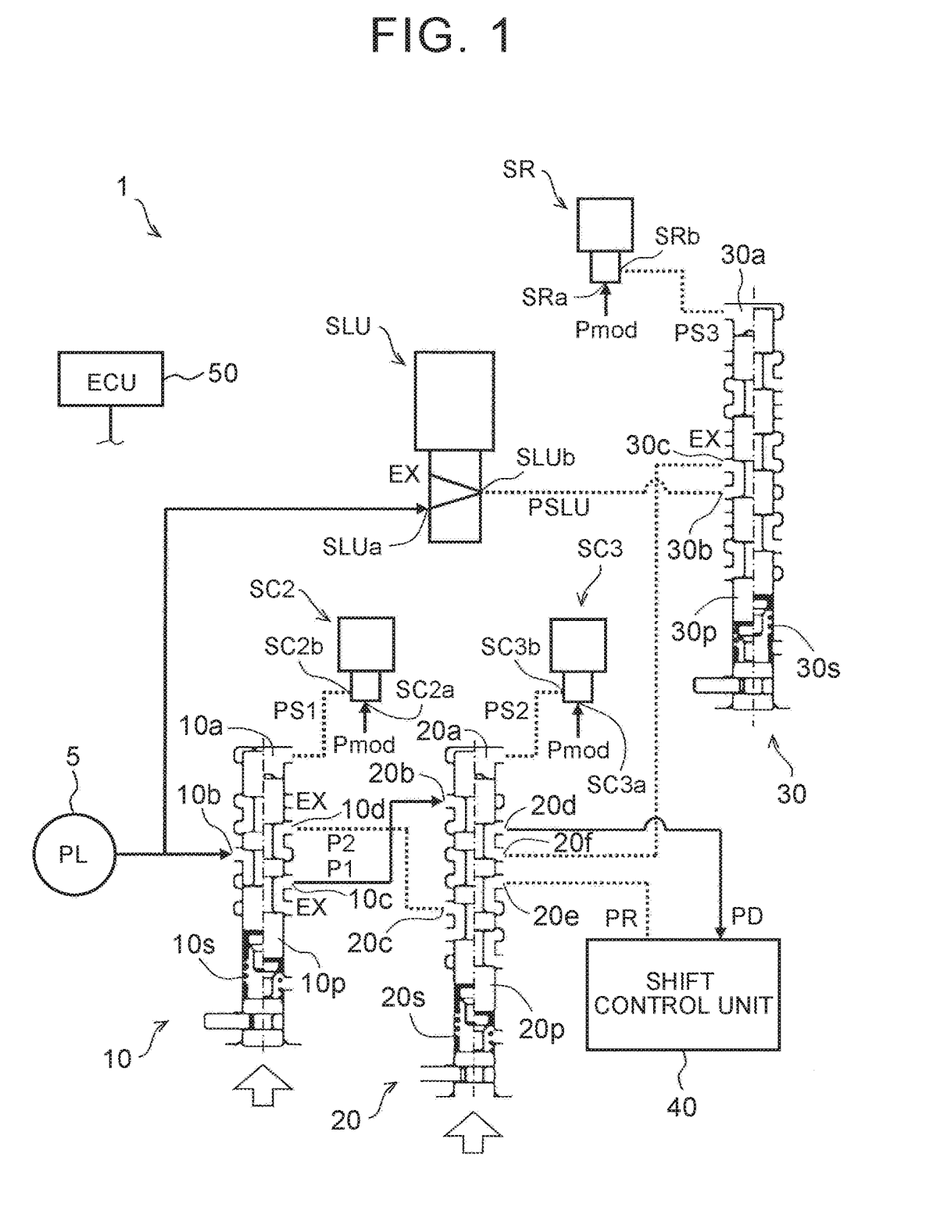
FIG. 1 is a schematic diagram illustrating a normal state for a D range in a hydraulic control device according to the present embodiment.
Figure 2:
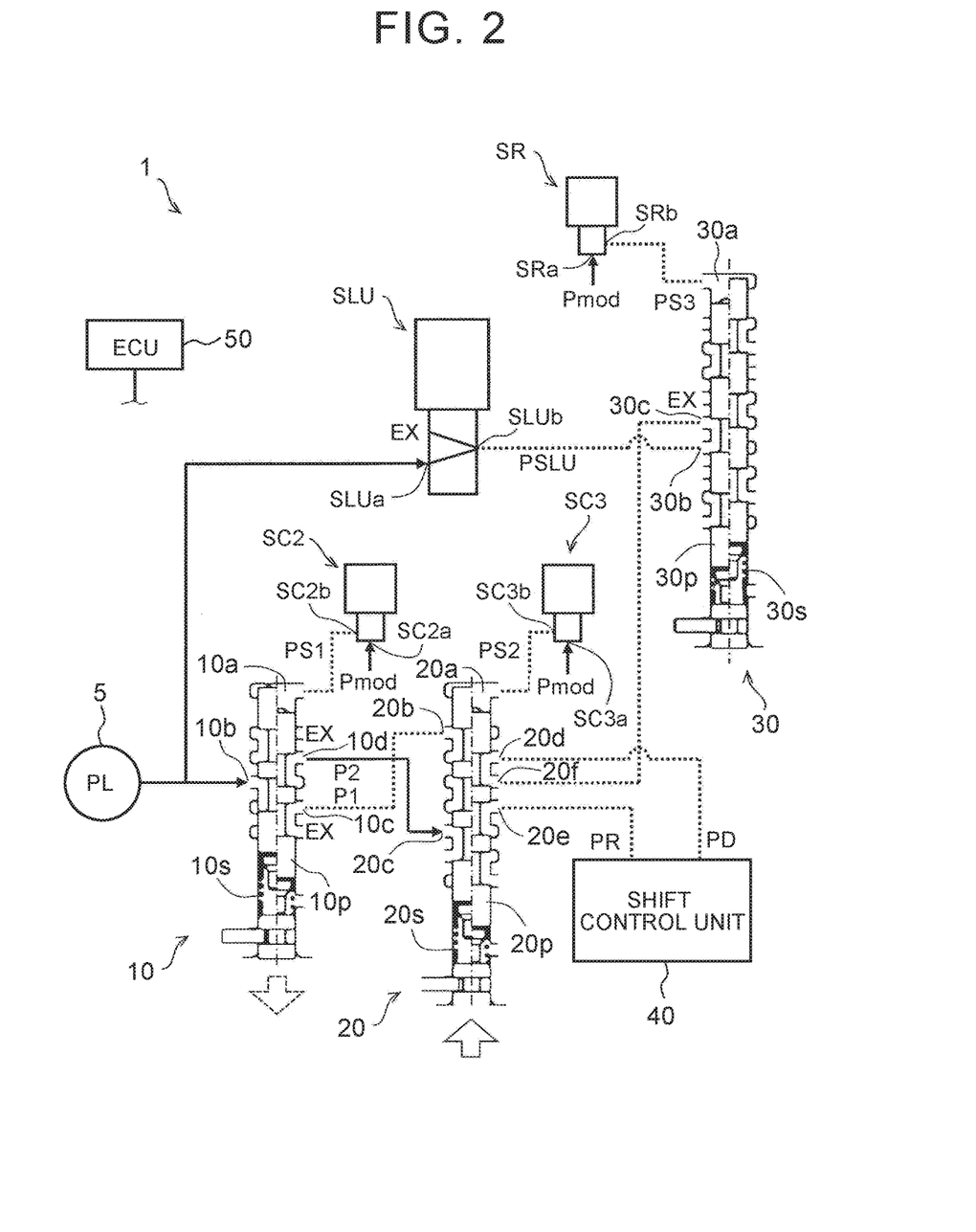
FIG. 2 is a schematic diagram illustrating a failure state in which a spool of a first cutoff valve sticks in a second position in the hydraulic control device according to the present embodiment.
Figure 3:
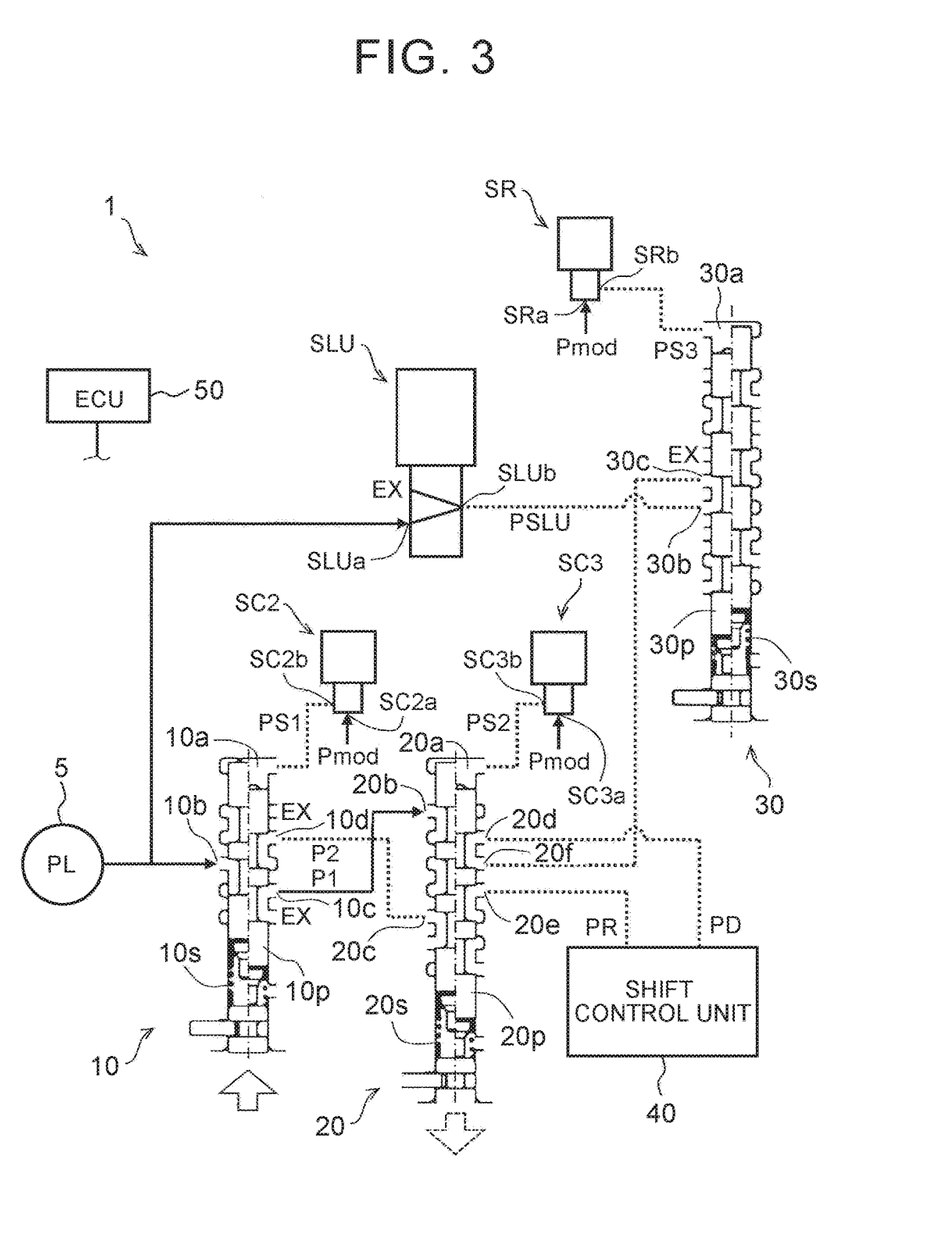
FIG. 3 is a schematic diagram illustrating a failure state in which a spool of a second cutoff valve sticks in a fourth position in the hydraulic control device according to the present embodiment.

As depicted in FIG. 1 to FIG. 3, this hydraulic control device 1 includes: a hydraulic-pressure generating unit 5; a first cutoff valve (first switching valve) 10; a solenoid valve (first solenoid valve) SC2 that can control the first cutoff valve 10; a second cutoff valve (second switching valve) 20; a solenoid valve (second solenoid valve) SC3 that can control the second cutoff valve 20; a fail-safe valve 30; a solenoid valve SR that can control the fail-safe valve 30; a lockup solenoid valve SLU; and a shift control unit 40. The hydraulic control device 1 is formed in a valve body. In the present embodiment, the first cutoff valve 10, the solenoid valve SC2, the second cutoff valve 20, and the solenoid valve SC3 are called a manual valveless circuit in particular. The solenoid valves and the shift control unit 40, for example, of the hydraulic control device 1 are controlled by a control unit (ECU) 50.

The hydraulic control device 1 is configured to generate range pressure corresponding to the travel range based on the line pressure PL generated in the hydraulic-pressure generating unit 5, and supply the range pressure to the shift control unit 40. Specifically, the hydraulic control device 1 is configured to supply to the shift control unit 40 forward range pressure PD used for formation of forward speeds and reverse range pressure PR used for formation of a reverse speed in accordance with a parking (P) range, a neutral (N) range, and travel ranges (a forward (D) range and a reverse (R) range) selected by range switching operation performed by a driver, thereby performing shifting (see FIG. 4).

The hydraulic-pressure generating unit 5 is controlled by the ECU 50, includes a primary regulator valve that regulates hydraulic pressure supplied from an oil pump (not depicted) into the line pressure PL, and regulates and generates various source pressures such as modulator pressure Pmod in addition to the line pressure PL. The hydraulic control device 1 includes a lubrication relay valve, a circulation modulator valve, a lockup relay valve, and a sequence valve (not depicted), for example, in which spool positions are changed or controlled to selectively switch or regulate hydraulic pressures based on the various source pressures for the respective oil passages. The hydraulic circuit structure for generating the line pressure PL and the modulator pressure Pmod, for example, is the same as that of a common hydraulic control device for an automatic transmission, and thus detailed description thereof is omitted. In the present embodiment, each valve actually has one spool, but in order to explain switched positions or controlled positions of the spool, the right-half state of the spool depicted in the drawing is called "right-half position", and the left-half state thereof is called "left-half position".

The solenoid valve SC2, which is controlled by the ECU 50, includes: an input port SC2$a$ into which the modulator pressure Pmod is input; and an output port SC2$b$ from which first signal pressure PS1 generated based on the modulator pressure Pmod can be output, and is configure to be able to control the first cutoff valve 10 with the output first signal pressure PS1.

The first cutoff valve 10 includes: an input port (first input port) 10$b$ that is capable of receiving an input of the line pressure PL; a first output port 10$c$ that is capable of outputting the line pressure PL as first hydraulic pressure (forward range pressure) P1; and a second output port 10$d$ that is capable of outputting the line pressure PL as second hydraulic pressure (reverse range pressure) P2. The first cutoff valve 10 also includes a spool 10$p$ that is switchable between a first position (the left-half position in the drawing, also called "off state") and a second position (the right-half position in the drawing, also called "on state"). In the first position, the input port 10$b$ communicates with the first output port 10$c$. In the second position, the input port 10$b$ communicates with the second output port 10$d$.

The first cutoff valve 10 further includes: a spring 10$s$ made of a compression coil spring that biases the spool 10$p$ so that the spool 10$p$ is positioned in the first position; and a first oil chamber 10$a$ into which the first signal pressure PS1 is input to press the spool 10$p$ against the spring 10$s$ so that the spool 10$p$ is positioned in the second position. Thus, the first cutoff valve 10 into which the line pressure PL is input can be switched between a state of outputting the input line pressure PL as the first hydraulic pressure P1 and a state of outputting the input line pressure PL as the second hydraulic pressure P2 by the first signal pressure PS1.

Specifically, the first cutoff valve 10 into which the line pressure PL is input is switchable between the first position in which the input line pressure PL is output as the first hydraulic pressure P1 when the first signal pressure PS1 is off and the second position in which the input line pressure PL is output as the second hydraulic pressure P2 when the first signal pressure PS1 is on.

The solenoid valve SC3, which is controlled by the ECU 50, includes: an input port SC3$a$ into which the modulator pressure Pmod is input; and an output port SC3$b$ that is capable of outputting second signal pressure PS2 generated based on the modulator pressure Pmod, and is configured to be able to control the second cutoff valve 20 with the output second signal pressure PS2.

The second cutoff valve 20 includes: a second input port 20$b$ that is connected to the first output port 10$c$ of the first cutoff valve 10 and into which the first hydraulic pressure P1 is input; a third input port 20$c$ that is connected to the second output port 10$d$ of the first cutoff valve 10 and into which the second hydraulic pressure P2 is input; a third output port 20$d$ that is capable of outputting the first hydraulic pressure P1 as the forward range pressure PD; a fourth output port 20$e$ that is capable of outputting the second hydraulic pressure P2 as the reverse range pressure PR; and a drain port 20$f$. The second cutoff valve 20 also includes a spool 20$p$ that is switchable between a third position (the left-half position in the drawing, also called "off state") and a fourth position (the right-half position in the drawing, also called "on state"). In the third position, the second input port 20$b$ communicates with the third output port 20$d$, and the fourth output port 20$e$ communicates with the drain port 20$f$. In the fourth position, the third input port 20$c$ communicates with the fourth output port 20$e$, and the third output port 20$d$ communicates with the drain port 20$f$.

The second cutoff valve 20 further includes: a spring 20$s$ made of a compression coil spring that biases the spool 20$p$ so that the spool 20$p$ is positioned in the first position; and an oil chamber 20$a$ into which the second signal pressure PS2 is input to press the spool 20$p$ against the spring 20$s$ so that the spool 20$p$ is positioned in the second position. Thus, by the second signal pressure PS2, the second cutoff valve 20 can be switched between a state in which the spool 20$p$ is positioned in the first position and a state in which the spool 20p is positioned in the second position.

Specifically, the second cutoff valve 20 is switchable between the third position in which the first hydraulic pressure P1 input from the first cutoff valve 10 is output as the forward range pressure PD to the shift control unit 40 and the second hydraulic pressure P2 is blocked when the second signal pressure PS2 is off and the fourth position in which the second hydraulic pressure P2 input from the first cutoff valve 10 is output as the reverse range pressure PR to the shift control unit 40 and the first hydraulic pressure P1 is blocked when the second signal pressure PS2 is on.

The solenoid valve SR, which is controlled by the ECU 50, includes: an input port SRa into which the modulator pressure Pmod is input; and an output port SRb that is capable of outputting third signal pressure PS3 generated based on the modulator pressure Pmod, and is configured to be able to control the fail-safe valve 30 with the third signal pressure PS3.

The fail-safe valve 30 includes: an input port 30b that is connected to the lockup solenoid valve SLU; an output port 30c that is connected to the drain port 20f of the second cutoff valve 20; and a drain hole EX. The fail-safe valve 30 also includes a spool 30p that is switchable between a fifth position (the left-half position in the drawing) and a sixth position (the right-half position in the drawing). In the fifth position, the input port 30b communicates with the output port 30c. In the sixth position, communication between the input port 30b and the output port 30c is blocked, and the drain port 20f and the output port 30c communicate with the drain hole EX.

The fail-safe valve 30 further includes: a spring 30s made of a compression coil spring that biases the spool 30p so that the spool 30p is positioned in the sixth position; and an oil chamber 30a into which the third signal pressure PS3 is input to press the spool 30p against the spring 30s so that the spool 30p is positioned in the fifth position. Thus, by the third signal pressure PS3, the fail-safe valve 30 can be switched between a failure state (the left-half position in the drawing) of supplying lockup pressure (fail-safe hydraulic pressure) PSLU from the lockup solenoid valve SLU to the drain port 20f and a normal state (the right-half position in the drawing) of blocking lockup pressure PSLU to the drain port 20f to stop the supply and allowing the drain port 20f to communicate with the drain hole EX.

Specifically, the lockup pressure PSLU input from the fail-safe valve 30 into the second cutoff valve 20 is output as the reverse range pressure PR from the second cutoff valve 20 to the shift control unit 40 when the second cutoff valve 20 is in the third position, and is output as the forward range pressure PD from the second cutoff valve 20 to the shift control unit 40 when the second cutoff valve 20 is in the fourth position.

As the solenoid valves SC2, SC3, and SR described above, those of what is called a normally closed (N/C) type are used that block communication between input ports and output ports not to output the respective signal pressures when not energized, and establish communication therebetween to output the respective signal pressures when energized. In the present embodiment, as the solenoid valves SC2, SC3, and SR, those of the normally closed type are used, but the present disclosure is not limited to this and those of what is called a normally open (N/O) type may be used that establish communication between the input ports and the output ports when not energized, and establish communication therebetween when energized. In both types, the solenoid valves SC2, SC3, and SR are configured to output or not to output the respective signal pressures in response to electric signals.

The lockup solenoid valve SLU, which is controlled by the ECU 50, includes: an input port SLUa into which the line pressure PL is input; and an output port SLUb that is capable of outputting the lockup pressure PSLU generated based on the line pressure PL to the input port 30b of the fail-safe valve 30, and is configured to generate the lockup pressure PSLU for controlling the engagement state of a lockup clutch that can lock up a fluid transmission apparatus such as a torque converter. The lockup solenoid valve SLU is configured to supply the lockup pressure PSLU to the drain port 20f when the fail-safe valve 30 is in the failure state.

Because the lockup solenoid valve SLU controls the engagement state of the lockup clutch with the lockup pressure PSLU under normal conditions, the lockup pressure PSLU may be output during traveling. To cope with this, in the present embodiment, the lockup pressure PSLU is supplied to the drain port 20f via the fail-safe valve 30, and thus the lockup pressure PSLU output during normal traveling is blocked by the fail-safe valve 30. This makes it possible to prevent the lockup pressure PSLU from being excessively supplied.

In the present embodiment, the shift control unit 40 includes a plurality of linear solenoid valves each of which can engage and disengage the corresponding one of the first to the fourth clutches and the first and the second brakes. With the forward range pressure PD or the reverse range pressure PR supplied, the shift control unit 40 controls formation of a shift speed of a speed change mechanism that can form a plurality of shift speeds by combining engagement and disengagement among a plurality of engagement elements. To the linear solenoid valves, in addition to the forward range pressure PD and the reverse range pressure PR, the line pressure PL is appropriately supplied. The hydraulic circuit structure of the shift control unit 40 is the same as that of a common automatic transmission, and thus detailed description thereof is omitted.

The ECU 50 includes a CPU, a ROM that stores a processing program, a RAM that temporarily stores data, input and output ports, and a communication port. To the ECU 50, an accelerator pedal position sensor, an engine rotation speed sensor, an input-shaft rotation speed sensor of the automatic transmission, an output-shaft rotation speed sensor of the automatic transmission, and a shift position sensor of a shift lever, for example, are connected via the input port. The ECU 50 is configured to compute the vehicle speed based on the output-shaft rotation speed obtained by the output-shaft rotation speed sensor, and can detect whether only the engine rotation speed is increasing without increase of the vehicle speed when the driver depresses the accelerator pedal, i.e., whether the engine is racing. The ECU 50 is also configured to compute the actual speed ratio based on the output-shaft rotation speed and the input-shaft rotation speed obtained by the input-shaft rotation speed sensor, and can detect whether the actual shift speed is normal by comparison with the shift position. The ECU 50 is further configured to store histories of the shift position by using the RAM, and can detect whether the shift position was changed from the R position to the D position in the past 10 seconds.

When either one of the switching valves of the first cutoff valve 10 and the second cutoff valve 20 has become unswitchable, the ECU 50 controls the state of the other switching valve, which has not stuck, with the first signal pressure PS1 or the second signal pressure PS2 so that the forward range pressure PD or the reverse range pressure PR is supplied from the second cutoff valve 20 to the shift control unit 40.

When either one of the switching valves of the first cutoff valve 10 and the second cutoff valve 20 has become unswitchable, the ECU 50 switches the fail-safe valve 30 into the failure state with the third signal pressure PS3, and controls the lockup solenoid valve SLU to be on, thereby causing the lockup solenoid valve SLU to output the lockup pressure PSLU. Consequently, the lockup pressure PSLU is input into the drain port 20f, and based on the lockup pressure PSLU, the forward range pressure PD is output from the third output port 20d that communicates with the drain port 20f or the reverse range pressure PR is output from the fourth output port 20e that communicates with the drain port 20f.

The following describes operation of the hydraulic control device 1 for the automatic transmission according to the present embodiment in detail with reference to FIG. 1 to FIG. 5.

Figure 4:
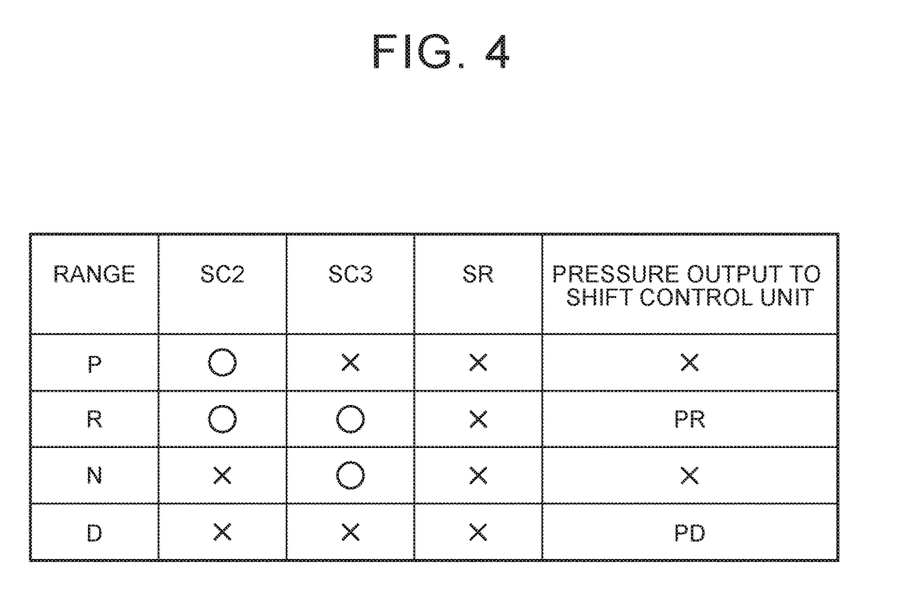
FIG. 4 is an operation table of solenoid valves corresponding to travel ranges in the hydraulic control device according to the present embodiment.

Under normal conditions in which a failure does not occur, as depicted in FIG. 4, the ECU 50 controls the solenoid valve SR to be continuously in the off state, and the fail-safe valve 30 is in the normal state. Thus, as depicted in FIG. 1, even when the lockup solenoid valve SLU outputs the lockup pressure PSLU to generate lockup pressure, the lockup pressure PSLU is blocked by the fail-safe valve 30 to prevent excessive supply. Because the fail-safe valve 30 is in the normal state, the third output port 20d or the fourth output port 20e that communicates with the drain port 20f of the second cutoff valve 20 communicates with the drain port of the fail-safe valve 30.

When the D range is selected as the travel range, as depicted in FIG. 4, the ECU 50 controls the solenoid valves SC2 and SC3 to be in the off state. Accordingly, as depicted in FIG. 1, the first signal pressure PS1 is not output, so that the first cutoff valve 10 is positioned in the first position, and the second signal pressure PS2 is not output, so that the second cutoff valve 20 is positioned in the first position. At this time, the line pressure PL supplied from the hydraulic-pressure generating unit 5 is output as the first hydraulic pressure P1 from the input port 10b of the first cutoff valve 10 through the first output port 10c. Furthermore, this first hydraulic pressure P1 is supplied as the forward range pressure PD from the second input port 20b of the second cutoff valve 20 through the third output port 20d to the shift control unit 40. Simultaneously, the fourth output port 20e communicates with the drain port of the fail-safe valve 30 through the drain port 20f, and the reverse range pressure PR is not supplied.

When the R range is selected as the travel range, as depicted in FIG. 4, the ECU 50 controls the solenoid valves SC2 and SC3 to be in the on state. Accordingly, the first signal pressure PS1 is output, so that the first cutoff valve 10 is positioned in the second position, and the second signal pressure PS2 is output, so that the second cutoff valve 20 is positioned in the second position. At this time, the line pressure PL supplied from the hydraulic-pressure generating unit 5 is output as the second hydraulic pressure P2 from the input port 10b of the first cutoff valve 10 through the second output port 10d. Furthermore, this second hydraulic pressure P2 is supplied as the reverse range pressure PR from the third input port 20c of the second cutoff valve 20 through the fourth output port 20e to the shift control unit 40. Simultaneously, the third output port 20d communicates with the drain port of the fail-safe valve 30 through the drain port 20f, and the forward range pressure PD is not supplied.

When the P range is selected, as depicted in FIG. 4, the ECU 50 controls the solenoid valve SC2 to be in the on state and controls the solenoid valve SC3 to be in the off state. Accordingly, the first signal pressure PS1 is output, so that the first cutoff valve 10 is positioned in the second position, and the second signal pressure PS2 is not output, so that the second cutoff valve 20 is positioned in the first position. At this time, the line pressure PL supplied from the hydraulic-pressure generating unit 5 is output as the second hydraulic pressure P2 from the input port 10b of the first cutoff valve 10 through the second output port 10d. Furthermore, this second hydraulic pressure P2 is input into the third input port 20c of the second cutoff valve 20, and is then drained immediately or used as parking pressure, for example.

When the N range is selected, as depicted in FIG. 4, the ECU 50 controls the solenoid valve SC2 to be in the off state, and controls the solenoid valve SC3 to be in the on state. Accordingly, the first signal pressure PS1 is not output, so that the first cutoff valve 10 is positioned in the first position, and the second signal pressure PS2 is output, so that the second cutoff valve 20 is positioned in the second position. At this time, the line pressure PL supplied from the hydraulic-pressure generating unit 5 is output as the first hydraulic pressure P1 from the input port 10b of the first cutoff valve 10 through the first output port 10c. Furthermore, this first hydraulic pressure P1 is input into the second input port 20b of the second cutoff valve 20, but is blocked immediately.

The following describes operation when either one of the first cutoff valve 10 and the second cutoff valve 20 has become unswitchable. Examples in which the cutoff valve becomes unswitchable include valve sticking (sticking of a valve due to foreign matter caught), and off failure and on failure of the solenoid valves SC2 and SC3, and herein, an example will be described in which valve sticking has occurred.

For example, as depicted in FIG. 2, if a failure has occurred in which the first cutoff valve 10 sticks in the second position, when the D range is selected as the travel range, the ECU 50 controls the solenoid valves SC2 and SC3 to be in the off state. However, even when the first signal pressure PS1 is not output from the solenoid valve SC2, the first cutoff valve 10 stays in the second position, so that the line pressure PL is output as the second hydraulic pressure P2 from the second output port 10d of the first cutoff valve 10. In contrast, the second cutoff valve 20 switches into the first position, so that the second hydraulic pressure P2 is input into the third input port 20c of the second cutoff valve 20, but is drained immediately, for example. This is the same operation as in the case of the P range under normal conditions. In this state, because a shift speed cannot be formed, if the driver depresses the accelerator pedal, for example, only the engine rotation speed increases (what is called racing of the engine) without increase of the vehicle speed. Thus, the ECU 50 determines that travel range pressure corresponding to the selected travel range is not output. The ECU 50 then detects whether an off failure has occurred in the linear solenoid valve of the shift control unit 40. If it is determined that the off failure has not occurred, the ECU 50 determines that a failure has occurred in which either the first cutoff valve 10 or the second cutoff valve 20 is unswitchable (valve sticking in this example), and confirms the determination of abnormality in the manual valveless circuit (see the flowchart in FIG. 5 described later).

After confirming the abnormality in the manual valveless circuit, the ECU 50 makes a transition to a limp-home mode, and controls the solenoid valve SC3 to be on, thereby switching the second cutoff valve 20 into the second position. Consequently, the second hydraulic pressure P2 from the first cutoff valve 10 is supplied as the reverse range pressure PR from the third input port 20c of the second cutoff valve 20 through the fourth output port 20e to the shift control unit 40.

The ECU 50 also controls the solenoid valve SR to be on, thereby switching the fail-safe valve 30 into the failure position. The ECU 50 further controls the lockup solenoid valve SLU to be on, thereby causing the lockup solenoid valve SLU to output the lockup pressure PSLU. Consequently, the lockup pressure PSLU is input from the input port 30b of the fail-safe valve 30 through the output port 30c to the drain port 20f of the second cutoff valve 20. Furthermore, the lockup pressure PSLU is output from the third output port 20d, and is supplied as the forward range pressure PD to the shift control unit 40. Thus, to the shift control unit 40, both of the forward range pressure PD and the reverse range pressure PR are supplied, whereby the shift speed of the D range as the travel range can be formed.

As another case, for example, as depicted in FIG. 3, if a failure has occurred in which the second cutoff valve 20 sticks in the second position, when the D range is selected as the travel range, the ECU 50 controls the solenoid valves SC2 and SC3 to be in the off state. However, even when the second signal pressure PS2 is not output from the solenoid valve SC3, the second cutoff valve 20 stays in the second position, so that the first hydraulic pressure P1 output from the first output port 10c of the first cutoff valve 10 is blocked at the second input port 20b of the second cutoff valve 20. This is the same operation as in the case of the N range under normal conditions. In this state, because a shift speed cannot be formed, if the driver depresses the accelerator pedal, for example, only the engine rotation speed increases without increase of the vehicle speed. Thus, the ECU 50 determines that travel range pressure corresponding to the selected travel range is not output. The ECU 50 then detects whether an off failure has occurred in the linear solenoid valve of the shift control unit 40. If it is determined that the off failure has not occurred, the ECU 50 determines that a failure has occurred in which either the first cutoff valve 10 or the second cutoff valve 20 is unswitchable, and confirms the determination of abnormality in the manual valveless circuit (see the flowchart in FIG. 5 described later).

After confirming the abnormality in the manual valveless circuit, the ECU 50 makes a transition to the limp-home mode, and controls the solenoid valve SC2 to be left off and controls the solenoid valve SC3 to be on, thereby trying to switch the second cutoff valve 20 to be in the second position. At this time, the second cutoff valve is already positioned in the second position, and thus the position is not changed. Consequently, the first hydraulic pressure P1 from the first cutoff valve 10 is input into the second input port 20b of the second cutoff valve 20, and is blocked by the second cutoff valve 20.

The ECU 50 also controls the solenoid valve SR to be on, thereby switching the fail-safe valve 30 into the failure position. The ECU 50 further controls the lockup solenoid valve SLU to be on, thereby causing the lockup solenoid valve SLU to output the lockup pressure PSLU. Consequently, the lockup pressure PSLU is input from the input port 30b of the fail-safe valve 30 through the output port 30c into the drain port 20f of the second cutoff valve 20. Furthermore, the lockup pressure PSLU is output from the third output port 20d, and is supplied as the forward range pressure PD to the shift control unit 40. Thus, to the shift control unit 40, the forward range pressure PD is supplied, whereby the shift speed of the D range as the travel range can be formed.

Figure 5:
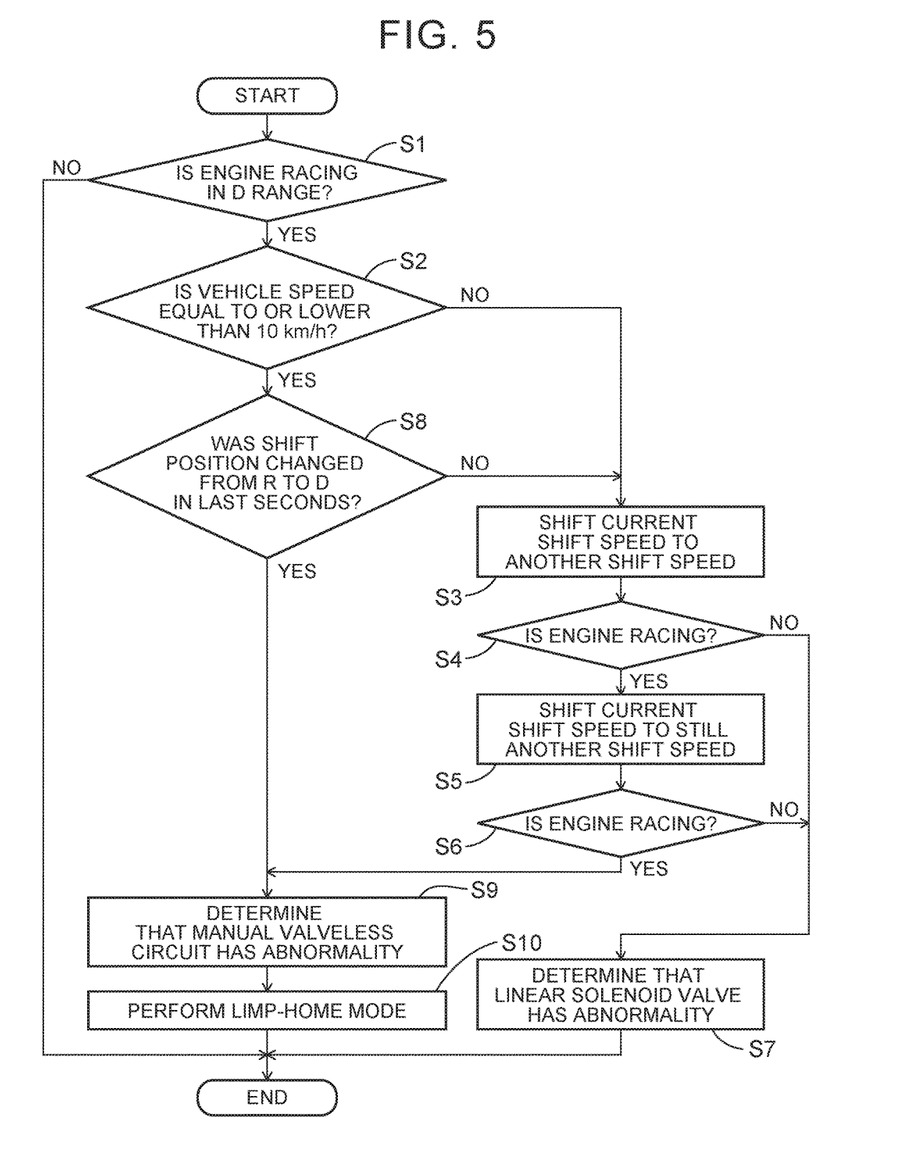
FIG. 5 is a flowchart illustrating a processing procedure when a failure occurs in the hydraulic control device according to the present embodiment.

The following describes the operation when either one of the first cutoff valve 10 and the second cutoff valve 20 has become unswitchable with reference to the flowchart illustrated in FIG. 5. It should be noted that this flowchart is merely one example of the processing procedure, and the present disclosure is not limited to this.

To begin with, the ECU 50 determines whether the travel range is the D range and the engine is racing, i.e., whether only the engine rotation speed increases without increase of the vehicle speed when the driver depresses the accelerator pedal (step S1). If the ECU 50 determines that the travel range is not the D range or the engine is not racing, the ECU 50 does not have to make a transition to the limp-home mode, and thus this processing ends.

If the ECU 50 determines that the travel range is the D range and the engine is racing, the ECU 50 determines whether the vehicle speed is equal to or lower than 10 km/h, for example, i.e., whether the vehicle is traveling at low speed or is stopping (step S2). If the ECU 50 determines that the vehicle speed is not equal to or lower than 10 km/h, for example, i.e., determines that the vehicle is traveling forward at a vehicle speed exceeding such a low speed, the ECU 50 performs processing of detecting the presence of off failure of the linear solenoid valve (step S3 to step S6) because it is likely that the racing of the engine is caused by the off failure of the linear solenoid valve.

Specifically, the ECU 50 shifts the current shift speed (e.g., second speed) to another shift speed (e.g., third speed) (step S3). The ECU 50 then determines whether the engine is still racing (step S4). If the ECU 50 determines that the engine is still racing, the ECU 50 shifts the current shift speed (e.g., third speed) to still another shift speed (e.g., seventh speed) (step S5). The ECU 50 then determines whether the engine is still racing (step S6). If the ECU 50 determines that the engine is still racing, the ECU 50 confirms the determination that the manual valveless circuit described later has an abnormality (step S9).

If the ECU 50 determines that the engine is not racing at step S4, the ECU 50 determines that, for example, a linear solenoid valve that is associated with formation of the second speed and is not associated with formation of the third speed has an abnormality (step S7). If the ECU 50 determines that the engine is not racing at step S6, the ECU 50 determines that, for example, a linear solenoid valve that is associated with formation of the second speed and the third speed and is not associated with the seventh speed has an abnormality (step S7). After this determination, the processing ends, and appropriate processing based on determination results is performed.

If the ECU 50 determines that the vehicle speed is equal to or lower than 10 km/h, for example, at step S2, the ECU 50 refers to histories of the shift position, and determines whether the shift position was changed from the R position to the D position in the past 10 seconds (step S8). If the ECU 50 determines that the shift position was not changed from the R position to the D position in the past 10 seconds, because the on or the off state of the first cutoff valve 10 and the second cutoff valve 20 did not change in the last seconds, the ECU 50 performs the processing of detecting the presence of the off failure of the linear solenoid valve (step S3 to step S6) because it is likely that the racing of the engine is caused by the off failure of the linear solenoid valve.

If the ECU 50 determines that the shift position was changed from the R position to the D position in the past 10 seconds, because the first cutoff valve 10 and the second cutoff valve 20 switched from the on state to the off state, the ECU 50 determines that the racing of the engine is caused by on failure in which either the first cutoff valve 10 or the second cutoff valve 20 cannot be in the off state, and confirms the determination of abnormality of the manual valveless circuit (step S9).

The ECU 50 performs the limp-home mode (step S10), controls the solenoid valve SC2 to be left off, and controls the solenoid valve SC3 to be on. The ECU 50 also controls the solenoid valve SR and the lockup solenoid valve SLU to be on. Consequently, when the first cutoff valve 10 has stuck in the second position, the reverse range pressure PR is supplied from the second cutoff valve 20 to the shift control unit 40, and the lockup pressure PSLU from the lockup solenoid valve SLU is supplied as the forward range pressure PD to the shift control unit 40. Thus, the shift speed of the D range as the travel range can be formed. When the second cutoff valve 20 has stuck in the second position, hydraulic pressure is not supplied from the second cutoff valve 20, but the lockup pressure PSLU from the lockup solenoid valve SLU is supplied as the forward range pressure PD to the shift control unit 40, whereby the shift speed of the D range as the travel range can be formed.

In the present embodiment described above, as an example in which either one of the first cutoff valve 10 and the second cutoff valve 20 has become unswitchable, an example in which valve sticking occurs has been described. However, it should be noted that the present disclosure is not limited to this. Examples in which either one of the first cutoff valve 10 and the second cutoff valve 20 has become unswitchable include off failure and on failure of the solenoid valves SC2 and SC3.

For example, when an off failure of the solenoid valve SC2 has occurred, the first cutoff valve 10 is set into the first position, and accordingly the ECU 50 controls the solenoid valve SC3 to be off, thereby switching the second cutoff valve 20 into the third position. Thus, the forward range pressure PD can be output to the shift control unit 40. For example, in the event of off failure of the solenoid valve SC3, the second cutoff valve 20 is set into the third position, and accordingly the ECU 50 controls the solenoid valve SC2 to be off, thereby switching the first cutoff valve 10 into the first position. Thus, the forward range pressure PD can be output to the shift control unit 40. Furthermore, for example, in the event of off failure of both of the solenoid valves SC2 and SC3 due to an all-off failure or other failures, the first cutoff valve 10 is set into the first position and the second cutoff valve 20 is set into the third position, and thus the forward range pressure PD can be output to the shift control unit 40.

For example, in the event of on failure of the solenoid valve SC3, the second cutoff valve 20 is set into the fourth position, and accordingly the ECU 50 controls the solenoid valve SR to be on, thereby switching the fail-safe valve 30 into the failure state. Thus, the lockup pressure PSLU can be output as the forward range pressure PD through the second cutoff valve 20 to the shift control unit 40. At this time, when the solenoid valve SC2 operates normally, the ECU 50 controls the solenoid valve SC2 to be off, thereby switching the first cutoff valve 10 into the first position, which enables the second cutoff valve 20 to block the first hydraulic pressure P1. For example, even in the event of on failure of both of the solenoid valves SC2 and SC3, the ECU 50 controls the solenoid valve SR to be on, thereby switching the fail-safe valve 30 into the failure state. Thus, the lockup pressure PSLU can be output as forward range pressure PD through the second cutoff valve 20, so that both of the forward range pressure PD and the reverse range pressure PR are input into the shift control unit 40. Even in this case, the forward traveling can be ensured.

As described in the foregoing, with the hydraulic control device 1 of the present embodiment, even in the event of off failure of at least one of the solenoid valves SC2 and SC3 for switching the cutoff valves 10 and 20, respectively, the first cutoff valve 10 can be set in the first position and the second cutoff valve 20 can be set in the third position. This can ensure that the forward range pressure PD is output to the shift control unit 40 even in such an event. Similarly, when the first cutoff valve 10 has stuck in the first position or when the second cutoff valve 20 has stuck in the third position, for example, it can be ensured that the forward range pressure PD is output to the shift control unit 40.

The hydraulic control device 1 of the present embodiment includes the fail-safe valve 30 that can output the lockup pressure PSLU to the second cutoff valve 20. The lockup pressure PSLU input from the fail-safe valve 30 into the second cutoff valve 20 is output as the reverse range pressure PR from the second cutoff valve 20 to the shift control unit 40 when the second cutoff valve 20 is in the third position, and is output as the forward range pressure PD from the second cutoff valve 20 to the shift control unit 40 when the second cutoff valve 20 is in the fourth position.

Thus, with the hydraulic control device 1 of the present embodiment, even if the second cutoff valve 20 has become unswitchable from the fourth position, the forward range pressure PD can be output by outputting the lockup pressure PSLU from the fail-safe valve 30, and thus the forward traveling can be ensured.

In the hydraulic control device 1 of the present embodiment, the solenoid valves SC2 and SC3 both are normally closed type solenoid valves that do not output signal pressure when not energized. Thus, for example, in the event of all-off failure related to a power supply system, even if both of the solenoid valves SC2 and SC3 are not energized and signal pressure is not output therefrom, it can be ensured that the forward range pressure PD is output.

In the hydraulic control device 1 of the present embodiment, the first cutoff valve 10 includes: the first input port 10b that is capable of receiving an input of the line pressure PL; the first output port 10c that is capable of outputting the first hydraulic pressure P1; the second output port 10d that is capable of outputting the second hydraulic pressure P2; and the first oil chamber 10a that communicates with the solenoid valve SC2 and that is capable of receiving an input of the first signal pressure PS1. The second cutoff valve 20 includes: the second input port 20b that is capable of receiving an input of the first hydraulic pressure P1; the third input port 20c that is capable of receiving an input of the second hydraulic pressure P2; the third output port 20d that is capable of outputting the forward range pressure PD; the fourth output port 20e that is capable of outputting the reverse range pressure PR; and the second oil chamber 20a that communicates with the solenoid valve SC3 and that is capable of receiving an input of the second signal pressure PS2. The first output port 10c communicates with the second input port 20b, the second output port 10d communicates with the third input port 20c, and the third output port 20d communicates with the shift control unit 40. Thus, the first hydraulic pressure P1 output from the first output port 10c is input into the second input port 20b, and is then input as the forward range pressure PD from the third output port 20d into the shift control unit 40.

In the hydraulic control device 1 of the present embodiment, the line pressure PL supplied to the first cutoff valve 10 is selectively output as either one of the first hydraulic pressure P1 and the second hydraulic pressure P2. The first hydraulic pressure P1 or the second hydraulic pressure P2 output from the first cutoff valve 10 is supplied to the second cutoff valve 20, and is then output as the forward range pressure PD from the output port 20d of the second cutoff valve 20 or the reverse range pressure PR from the output port 20e of the second cutoff valve 20. Accordingly, when the line pressure PL is caused to pass through the two switching valves 10 and 20 to generate the forward range pressure PD or the reverse range pressure PR as one of the two different travel range pressures, whichever travel range pressure is generated, a hydraulic pressure passes through the first cutoff valve 10 and passes through the second cutoff valve 20 in this order. Thus, as compared to the case of using a diagonally crossing-type hydraulic circuit structure where the order in which line pressure PL passes through the two switching valves is different between when the forward range pressure PD is generated and when the reverse range pressure PR is generated, the hydraulic circuit can be simplified, and simplification of control and downsizing of devices such as valve bodies can be achieved.

With the hydraulic control device 1 of the present embodiment, when either one of the switching valves of the first cutoff valve 10 and the second cutoff valve 20 has become unswitchable, the solenoid valve SC3 is controlled to be on, the fail-safe valve 30 is switched, and the lockup pressure PSLU is output from the lockup solenoid valve SLU, whereby the forward range pressure PD can be supplied to the shift control unit 40 whatever the cause of the failure that has occurred. This enables the shift control unit 40 to form forward shift speeds. In the hydraulic control device 1 of the present embodiment, because the hydraulic control device 1 can be structured with only the two switching valves 10 and 20 and the three solenoid valves SC2, SC3, and SLU as minimum necessary components. Thus, the hydraulic circuit can be simplified, and simplification of control and downsizing of the device can be achieved. Even in the event of on failure of either one of the first cutoff valve 10 and the second cutoff valve 20 (failure in which either one is positioned in the second position), the forward range pressure PD can be supplied to the shift control unit 40 by performing the same processing. This eliminates the need of providing a hydraulic pressure switch, for example, for detecting in which of the first cutoff valve 10 and the second cutoff valve 20 the on failure has occurred, thereby making it possible to prevent increase in the number of components, increase in costs, and upsizing of the device.

In the event of off failure in which either one of the first cutoff valve 10 and the second cutoff valve 20 is not switched into the on state, because the D range is formed when both of the first cutoff valve 10 and the second cutoff valve 20 are in the off state, the D range can be formed without any problem.

The hydraulic control device 1 of the present embodiment includes the fail-safe valve 30 which is interposed between the solenoid valve SR that is capable of supplying the third signal pressure PS3 and the lockup solenoid valve SLU and between the solenoid valve SR and the drain port 20f. The fail-safe valve 30 can be switched between the failure state and the normal state by the third signal pressure PS3. In the failure state, the lockup solenoid valve SLU communicates with the drain port 20f and thus the lockup pressure PSLU can be supplied to the drain port 20f. In the normal state, communication between the lockup solenoid valve SLU and the drain port 20f is blocked, the lockup pressure PSLU is not supplied to the drain port 20f, and the drain port 20f communicates with the drain hole EX.

Accordingly, in the hydraulic control device 1 of the present embodiment, because the fail-safe valve 30 is interposed between the lockup solenoid valve SLU and the drain port 20f, connection between the lockup solenoid valve SLU and the drain port 20f can be terminated. Thus, as a solenoid valve for outputting the fail-safe hydraulic pressure, the lockup solenoid valve SLU used for lockup can be used. This allows the lockup solenoid valve SLU to be used properly for each purpose so that the lockup solenoid valve SLU is used for lockup under normal conditions and is used for supplying the lockup pressure PSLU to the shift control unit 40 only in the event of failure. This eliminates the need of using the solenoid valve that outputs the fail-safe hydraulic pressure as a component used exclusively for failure, and thus the number of components can be prevented from increasing, and the device can be downsized.

In the hydraulic control device 1 of the present embodiment, the solenoid valve for outputting the fail-safe hydraulic pressure is the lockup solenoid valve SLU that generates the lockup pressure PSLU for controlling the engagement state of the lockup clutch that can lock up the fluid transmission apparatus, and the fail-safe hydraulic pressure is the lockup pressure PSLU.

Accordingly, in the hydraulic control device 1 of the present embodiment, the solenoid valve for outputting the fail-safe hydraulic pressure is the lockup solenoid valve SLU, which eliminates the need of using the solenoid valve that outputs the fail-safe hydraulic pressure as a component used exclusively for fail safe, and thus the number of components can be prevented from increasing, and the device can be downsized.

In the hydraulic control device 1 of the present embodiment, the line pressure PL is supplied to the lockup solenoid valve SLU, and the lockup solenoid valve SLU supplies the lockup pressure PSLU based on the line pressure PL.

Thus, the hydraulic control device 1 of the present embodiment can generate the forward range pressure PD, the reverse range pressure PR, and the lockup pressure PSLU by using the line pressure PL, thereby enabling the hydraulic circuit structure to be simplified.

In the above description of the hydraulic control device 1 of the present embodiment, a case has been described in which the solenoid valve for outputting the fail-safe hydraulic pressure is the lockup solenoid valve SLU, but the present disclosure is not limited to this, and another solenoid valve may be used.

In the above description of the hydraulic control device 1 of the present embodiment, a case has been described in which the fail-safe valve 30 is interposed between the solenoid valve for outputting the fail-safe hydraulic pressure and the drain port 20f, but the present disclosure is not limited to this, and the solenoid valve for outputting the fail-safe hydraulic pressure may be directly connected to the drain port 20f. In this case, the ECU 50 performs control so that the fail-safe hydraulic pressure is not output from the solenoid valve for outputting the fail-safe hydraulic pressure under normal conditions, and the fail-safe hydraulic pressure is output from the solenoid valve for outputting the fail-safe hydraulic pressure in the event of failure.

INDUSTRIAL APPLICABILITY

A hydraulic control device for an automatic transmission according to the present disclosure relates to a hydraulic control device for an automatic transmission mounted on an automobile, for example, and is preferably used specifically for a hydraulic control device for a shift-by-wire-type automatic transmission that can switch travel ranges with a plurality of switching valves that are electrically controlled.

The invention claimed is:

1. A hydraulic control device for an automatic transmission comprising:
a shift controller that controls a speed change mechanism;
a first solenoid valve that is capable of outputting first signal pressure;
a first switching valve into which source pressure is input and that is switchable between a first position in which the source pressure input is output as forward range pressure when the first signal pressure is off and a second position in which the source pressure input is output as reverse range pressure when the first signal pressure is on;
a second solenoid valve that is capable of outputting second signal pressure; and
a second switching valve that is switchable between a third position in which the forward range pressure input from the first switching valve is output to the shift controller and the reverse range pressure is blocked when the second signal pressure is off and a fourth position in which the reverse range pressure input from the first switching valve is output to the shift controller and the forward range pressure is blocked when the second signal pressure is on.

2. The hydraulic control device for an automatic transmission according to claim 1, further comprising:
a fail-safe valve that is capable of outputting fail-safe hydraulic pressure to the second switching valve,
wherein the fail-safe hydraulic pressure input from the fail-safe valve into the second switching valve is output as reverse range pressure from the second switching valve to the shift controller when the second switching valve is in the third position, and is output as forward range pressure from the second switching valve to the shift controller when the second switching valve is in the fourth position.

3. The hydraulic control device for an automatic transmission according to claim 2, wherein
both of the first solenoid valve and the second solenoid valve are normally closed type solenoid valves that do not output signal pressure when not energized.

4. The hydraulic control device for an automatic transmission according to claim 3, wherein:
the first switching valve includes: a first input port that is capable of receiving an input of the source pressure; a first output port that is capable of outputting the forward range pressure; a second output port that is capable of outputting the reverse range pressure; and a first oil chamber that communicates with the first solenoid valve and is capable of receiving an input of the first signal pressure,
the second switching valve includes: a second input port that is capable of receiving an input of the forward range pressure; a third input port that is capable of receiving an input of the reverse range pressure; a third output port that is capable of outputting the forward range pressure; a fourth output port that is capable of outputting the reverse range pressure; and a second oil chamber that communicates with the second solenoid valve and that is capable of receiving an input of the second signal pressure, and
the first output port communicates with the second input port, the second output port communicates with the third input port, and the third output port communicates with the shift controller.

5. The hydraulic control device for an automatic transmission according to claim 2, wherein:
the first switching valve includes: a first input port that is capable of receiving an input of the source pressure; a first output port that is capable of outputting the forward range pressure; a second output port that is capable of outputting the reverse range pressure; and a first oil chamber that communicates with the first solenoid valve and is capable of receiving an input of the first signal pressure,
the second switching valve includes: a second input port that is capable of receiving an input of the forward range pressure; a third input port that is capable of receiving an input of the reverse range pressure; a third output port that is capable of outputting the forward range pressure; a fourth output port that is capable of outputting the reverse range pressure; and a second oil chamber that communicates with the second solenoid valve and that is capable of receiving an input of the second signal pressure, and
the first output port communicates with the second input port, the second output port communicates with the third input port, and the third output port communicates with the shift controller.

6. The hydraulic control device for an automatic transmission according to claim 1, wherein both of the first solenoid valve and the second solenoid valve are normally closed type solenoid valves that do not output signal pressure when not energized.

7. The hydraulic control device for an automatic transmission according to claim 6, wherein:
the first switching valve includes: a first input port that is capable of receiving an input of the source pressure; a first output port that is capable of outputting the forward range pressure; a second output port that is capable of outputting the reverse range pressure; and a first oil chamber that communicates with the first solenoid valve and is capable of receiving an input of the first signal pressure,
the second switching valve includes: a second input port that is capable of receiving an input of the forward range pressure; a third input port that is capable of receiving an input of the reverse range pressure; a third output port that is capable of outputting the forward range pressure; a fourth output port that is capable of outputting the reverse range pressure; and a second oil chamber that communicates with the second solenoid valve and that is capable of receiving an input of the second signal pressure, and
the first output port communicates with the second input port, the second output port communicates with the third input port, and the third output port communicates with the shift controller.

8. The hydraulic control device for an automatic transmission according to claim 1, wherein:
the first switching valve includes: a first input port that is capable of receiving an input of the source pressure; a first output port that is capable of outputting the forward range pressure; a second output port that is capable of outputting the reverse range pressure; and a first oil chamber that communicates with the first solenoid valve and is capable of receiving an input of the first signal pressure,
the second switching valve includes: a second input port that is capable of receiving an input of the forward range pressure; a third input port that is capable of receiving an input of the reverse range pressure; a third output port that is capable of outputting the forward range pressure; a fourth output port that is capable of outputting the reverse range pressure; and a second oil chamber that communicates with the second solenoid valve and that is capable of receiving an input of the second signal pressure, and the first output port communicates with the second input port, the second output port communicates with the third input port, and the third output port communicates with the shift controller.

* * * * *